(12) United States Patent
Sueyoshi et al.

(10) Patent No.: US 12,407,061 B2
(45) Date of Patent: Sep. 2, 2025

(54) BATTERY MODULE, ELECTRIC POWER UNIT, AND WORKING MACHINE

(71) Applicant: HONDA MOTOR CO., LTD., Tokyo (JP)

(72) Inventors: Shunichiro Sueyoshi, Wako (JP); Keisuke Muraoka, Wako (JP); Shuji Nagatani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 632 days.

(21) Appl. No.: 17/703,954

(22) Filed: Mar. 24, 2022

(65) Prior Publication Data

US 2022/0216567 A1 Jul. 7, 2022

Related U.S. Application Data

(63) Continuation of application No. PCT/JP2019/039154, filed on Oct. 3, 2019.

(51) Int. Cl.
*H01M 50/367* (2021.01)
*H01M 50/213* (2021.01)
*H01M 50/247* (2021.01)

(52) U.S. Cl.
CPC ....... *H01M 50/367* (2021.01); *H01M 50/213* (2021.01); *H01M 50/247* (2021.01); *H01M 2220/30* (2013.01)

(58) Field of Classification Search
CPC .. H01M 50/213; H01M 50/247; H01M 50/35; H01M 50/358; H01M 50/367; H01M 2220/30
See application file for complete search history.

(56) References Cited

U.S. PATENT DOCUMENTS

| | | | |
|---|---|---|---|
| 6,566,005 | B1 | 5/2003 | Shimma et al. |
| 7,713,655 | B2 | 5/2010 | Ha et al. |
| 10,629,869 | B2 | 4/2020 | Nakamura et al. |
| 2010/0035142 | A1 | 2/2010 | Ha et al. |

(Continued)

FOREIGN PATENT DOCUMENTS

| | | |
|---|---|---|
| CN | 101517777 A | 8/2009 |
| CN | 104137296 A | 11/2014 |
| CN | 106252550 A | 12/2016 |

(Continued)

OTHER PUBLICATIONS

Chinese Office Action issued for Chinese Patent Application No. 201980027286.3 mailed on Jan. 2, 2024 (with Partial Translation).

(Continued)

*Primary Examiner* — Brittany L Raymond
(74) *Attorney, Agent, or Firm* — Thomas Horstemeyer, LLP

(57) ABSTRACT

The present invention provides a battery module comprising: a cell assembly formed by sandwiching a plurality of battery cells by a pair of holding members; and an accommodation case configured to accommodate the cell assembly, wherein the accommodation case includes a vent hole for gas, and wherein a flow path passing through the vent hole is formed in a labyrinth structure by covering the vent hole by a connecting portion between the pair of holding members.

12 Claims, 13 Drawing Sheets

(56) References Cited

U.S. PATENT DOCUMENTS

2018/0241017 A1    8/2018  Nakamura et al.
2020/0154962 A1    5/2020  Fie et al.

FOREIGN PATENT DOCUMENTS

| | | |
|---|---|---|
| CN | 108352472 A | 7/2018 |
| EP | 2828908 A1 | 1/2015 |
| EP | 3333934 A1 | 6/2018 |
| JP | 2001-143768 A | 5/2001 |
| JP | 2005-209369 A | 8/2005 |
| JP | 3742261 B2 | 2/2006 |
| JP | 2010-503973 A | 2/2010 |
| JP | 2016-018605 A | 2/2016 |
| JP | 2017-169279 A | 9/2017 |
| KR | 10-2018-0054482 A | 5/2018 |
| WO | 2018/224985 A1 | 12/2018 |
| WO | WO 2018-224985 * | 12/2018 |
| WO | 2019065033 A1 | 4/2019 |
| WO | 2021064950 A1 | 4/2021 |

OTHER PUBLICATIONS

International Search Report for PCT/JP2019/039154 mailed Dec. 17, 2019 with partial English Translation.
Supplementary European Search Report for European Application No. 19928306.0 mailed Oct. 11, 2021.

* cited by examiner

BATTERY MODULE, ELECTRIC POWER UNIT, AND WORKING MACHINE

CROSS-REFERENCE TO RELATED APPLICATION(S)

This application is a continuation of International Patent Application No. PCT/JP2019/039154 filed on Oct. 3, 2019, the entire disclosures of which are incorporated herein by reference.

BACKGROUND OF THE INVENTION

Field of the Invention

The present invention relates to a battery module, an electric power unit, and a working machine.

Description of the Related Art

Japanese Patent No. 3742261 discloses an arrangement of a battery pack with a plurality of cells arranged therein, in which an outer case is provided with a suction port and an exhaust port, and a ventilation passage is formed where cooling air entering from the suction port passes around and/or between the plurality of cells and is exhausted from the exhaust port.

The battery pack may be placed on a floor, a shelf, or the like in a state in which it is detached from a charger or a power tool. In such a case, a foreign substance may enter from the suction port or the exhaust port. The arrangement described in PTL 1 takes no measure to prevent entry of the foreign substance.

Therefore, the present invention has as its object to provide a battery module advantageous in reducing entry of foreign substances to the inside with a simple arrangement.

SUMMARY OF THE INVENTION

According to the present invention, there is provided a battery module comprising: a cell assembly formed by sandwiching a plurality of battery cells by a pair of holding members; and an accommodation case configured to accommodate the cell assembly, wherein the accommodation case includes a vent hole for gas, and wherein a flow path passing through the vent hole is formed in a labyrinth structure by covering the vent hole by a connecting portion between the pair of holding members.

Further features of the present invention will become apparent from the following description of exemplary embodiments with reference to the attached drawings.

DESCRIPTION OF THE EMBODIMENTS

Figure 1:
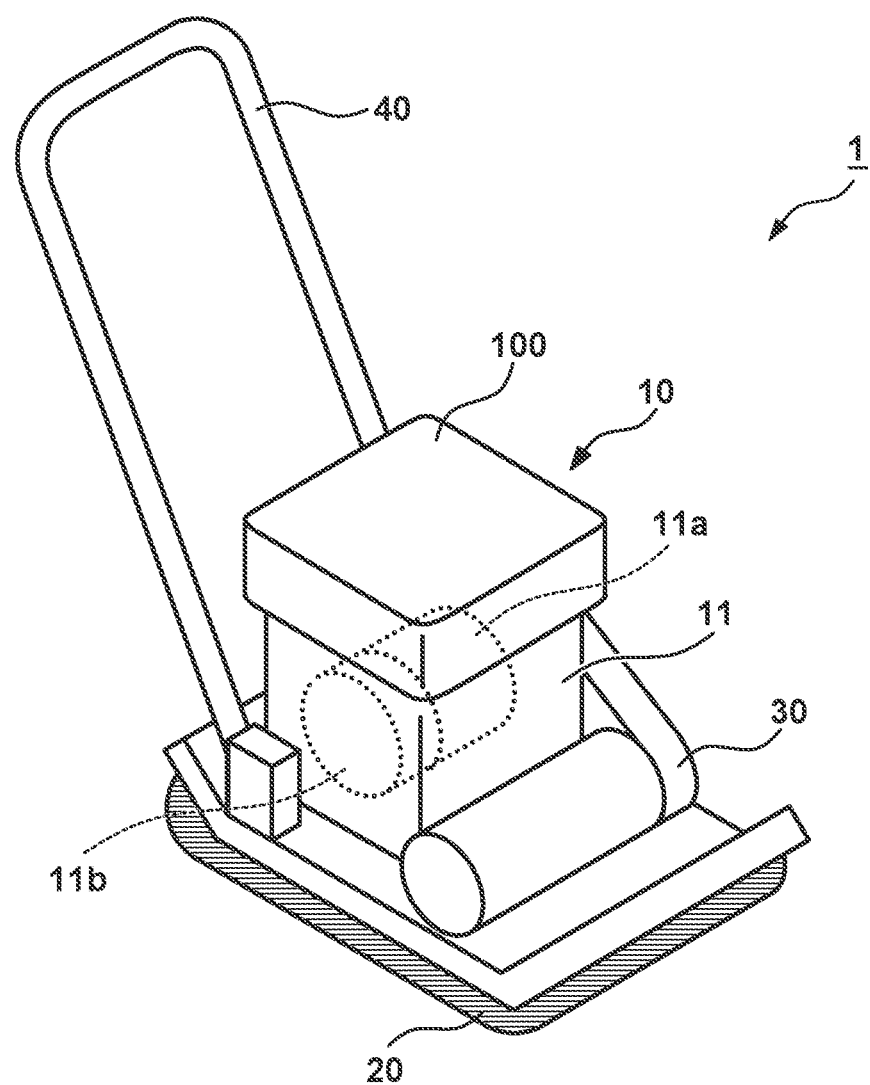
FIG. 1 is a view showing an arrangement example of a working machine.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

A working machine 1 of the first embodiment according to the present invention will be described. FIG. 1 is a schematic view showing an arrangement example of the working machine 1. The working machine 1 of this embodiment is a working machine (electric working machine) including an electric power unit 10 that includes a battery module 100 and a motor device 11. Examples of the working machine 1 include a plate compactor, a rammer, a lawn mower, a cultivator, and a snow remover, and FIG. 1 illustrates a plate compactor. The working machine 1 includes, for example, the electric power unit 10, a working unit 20 (working mechanism), a power transmission mechanism 30, and a steering handle 40. The working unit 20 is a unit for performing predetermined work, and in this embodiment, it is a unit that performs rolling compaction work to compact the ground.

The electric power unit 10 includes, for example, the battery module 100 and the motor device 11. The battery module 100 is a storage battery including a plurality of battery cells, and can be configured to be attachable/detachable to/from the motor device 11. The specific arrangement of the battery module 100 will be described later. The motor device 11 can include a motor 11a that is operated by electric power from the battery module 100, and a control unit (not shown) that controls driving of the motor. The control unit can be a PDU (Power Drive Unit), but may be configured to include a processor represented by a CPU, a storage device such as a semiconductor memory, an interface with an external device, and the like.

The motor device 11 is provided with a cooling fan 11b as an exhaust unit for exhausting the gas in an accommodation case 120 from exhaust holes formed in the accommodation case 120 of the battery module 100. The cooling fan 11b may also be used for cooling the motor 11a, or may be provided separately from a component for cooling the motor 11a. In this embodiment, the cooling fan 11b is rotatably attached to the shaft member of the motor 11a, and configured to rotate together with the shaft member of the motor 11a, thereby drawing the gas in the accommodation case 120 of the battery module 100 and exhausting the gas in the accommodation case 120 from the exhaust holes.

Figure 2:
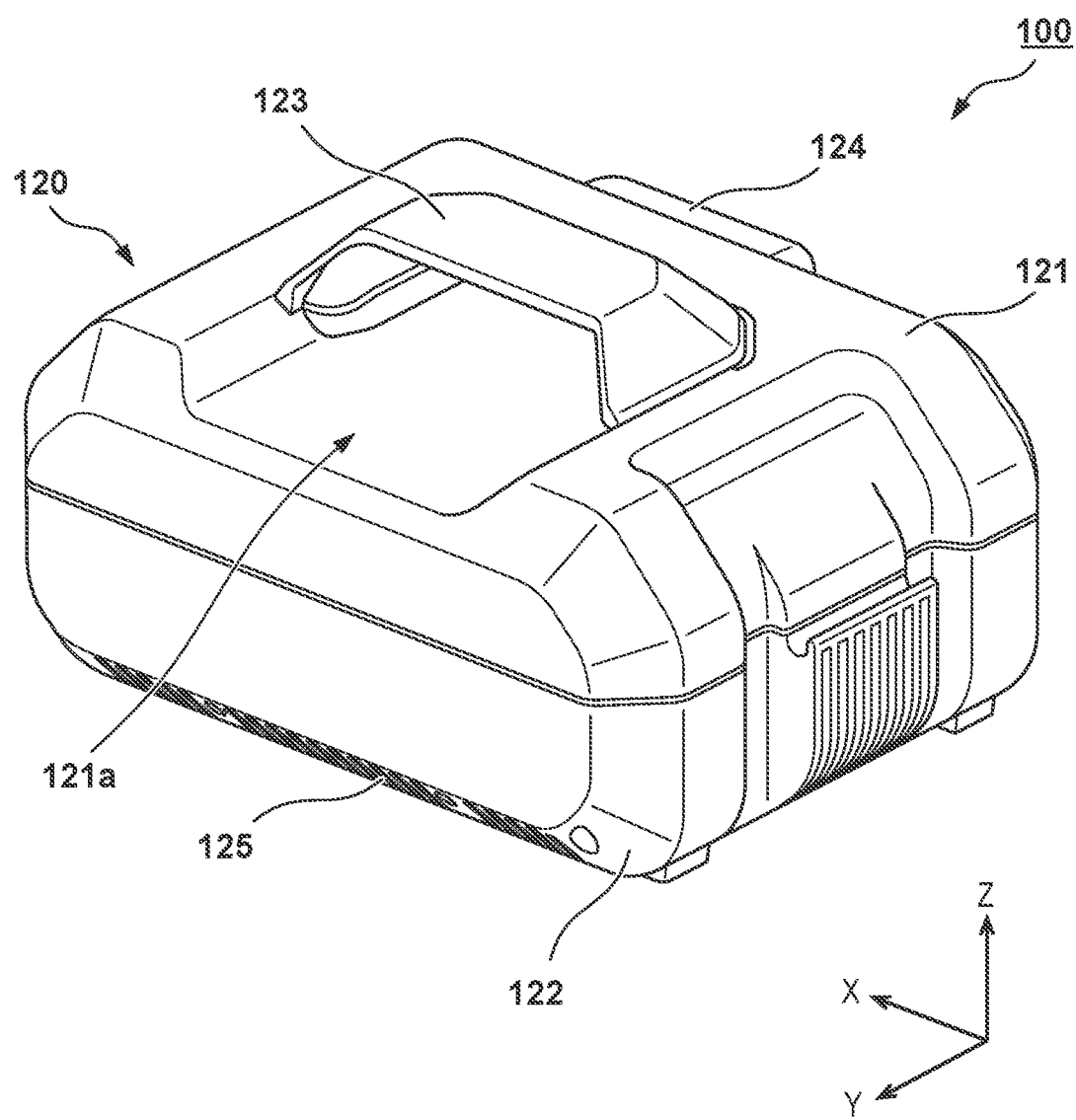
FIG. 2 is an external view (top perspective view) of a battery module.
Figure 3:
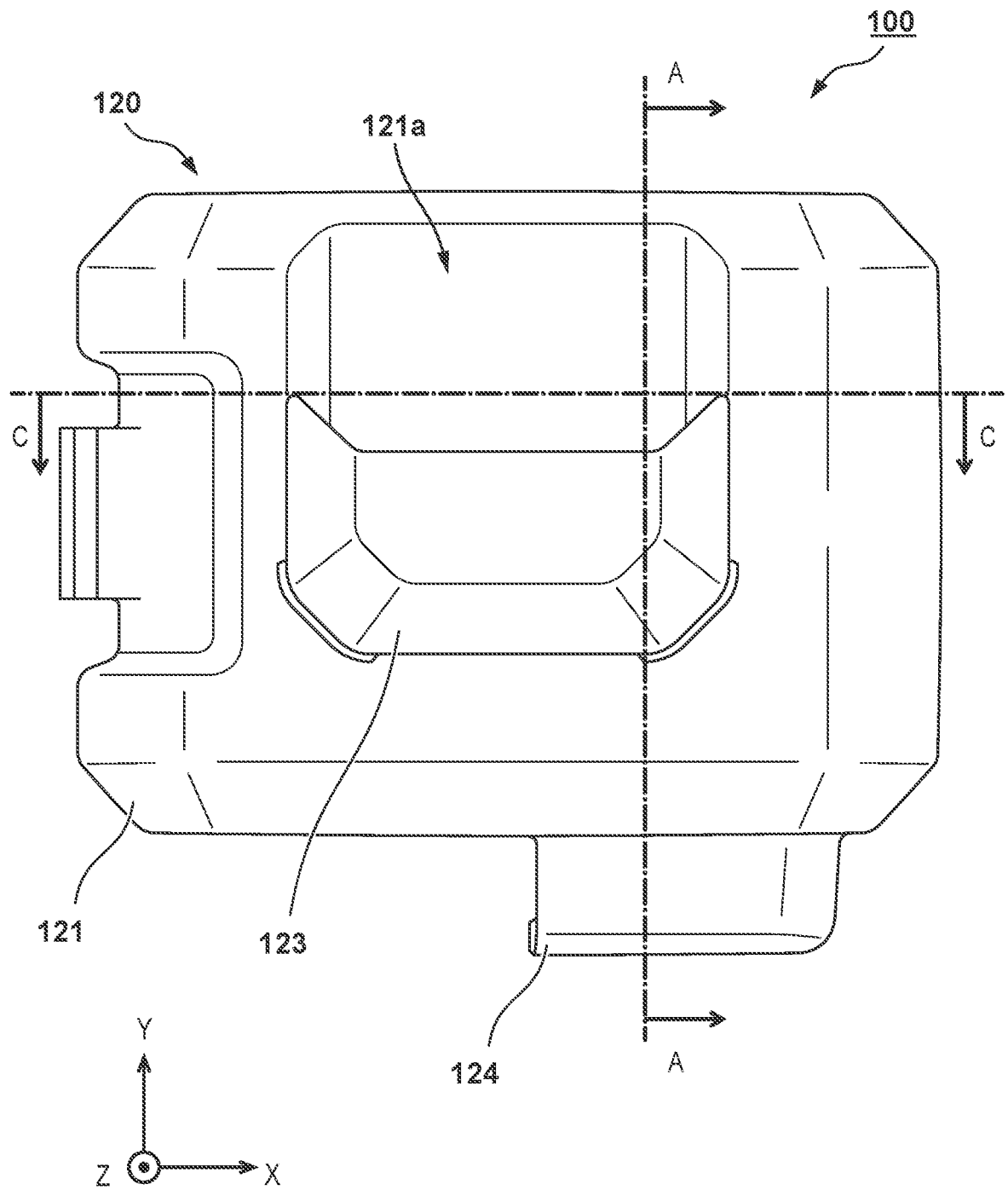
FIG. 3 is an external view (top view) of the battery module.
Figure 4:
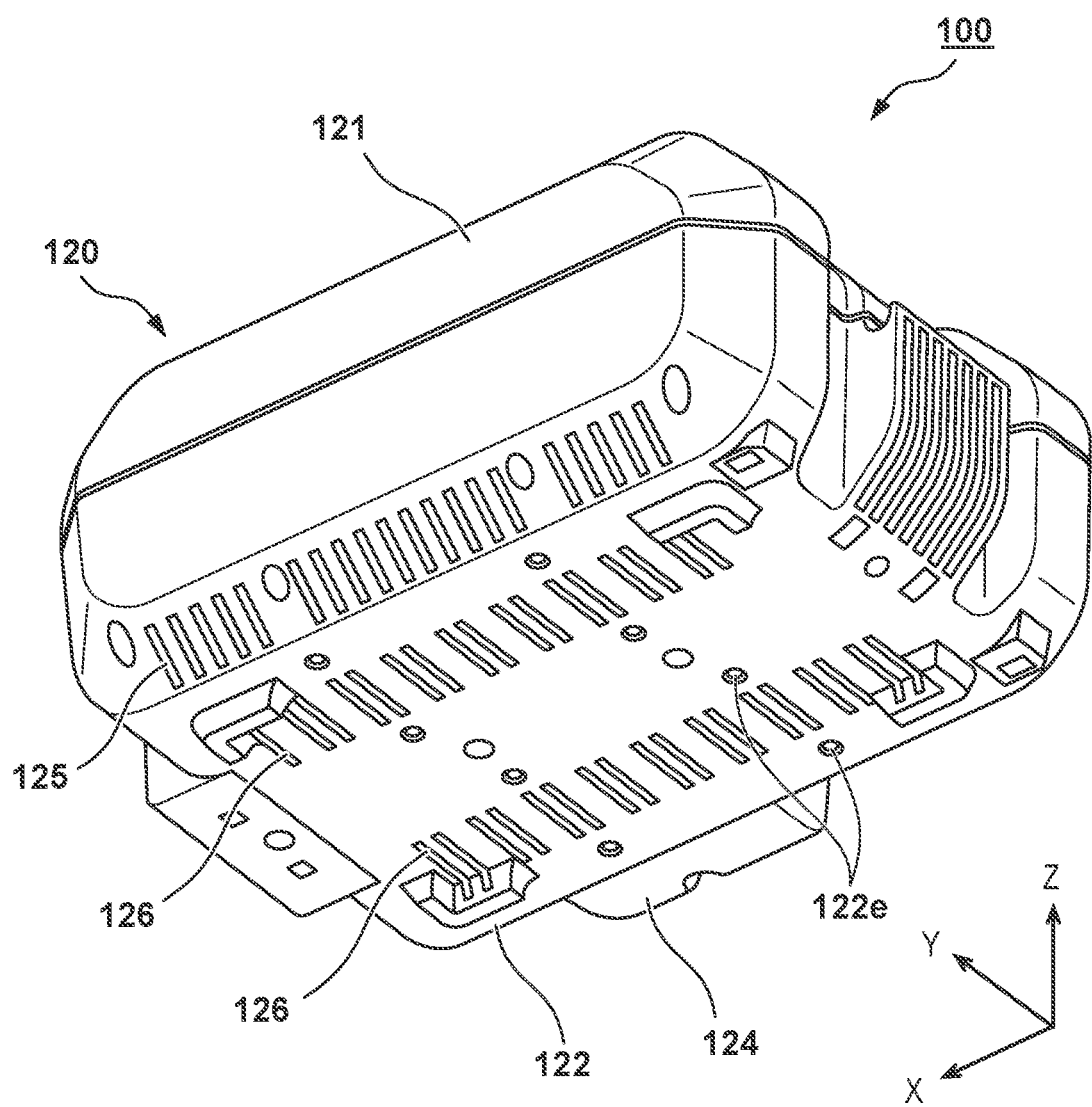
FIG. 4 is an external view (bottom perspective view) of the battery module.
Figure 5:
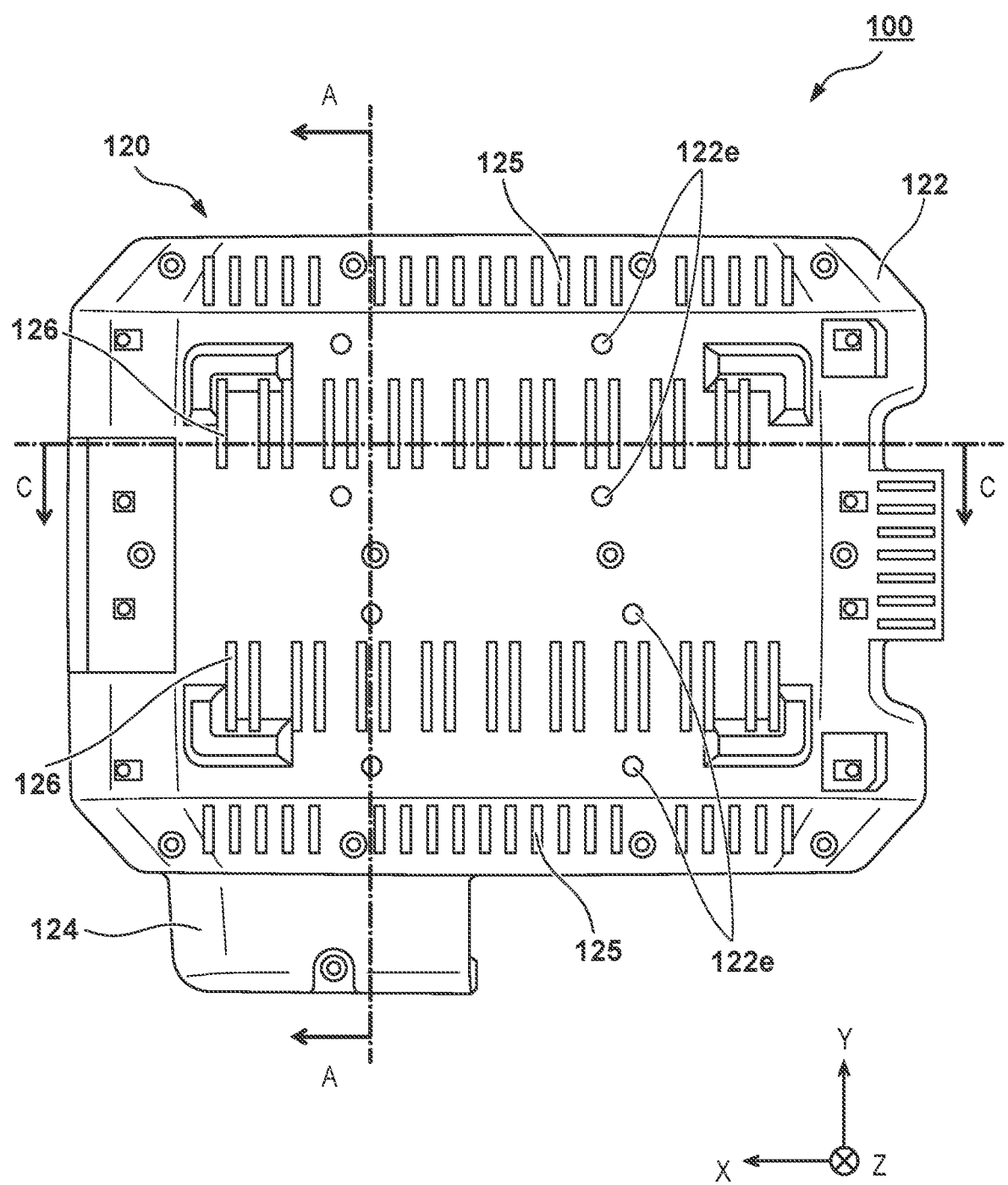
FIG. 5 is an external view (bottom view) of the battery module.
Figure 6:
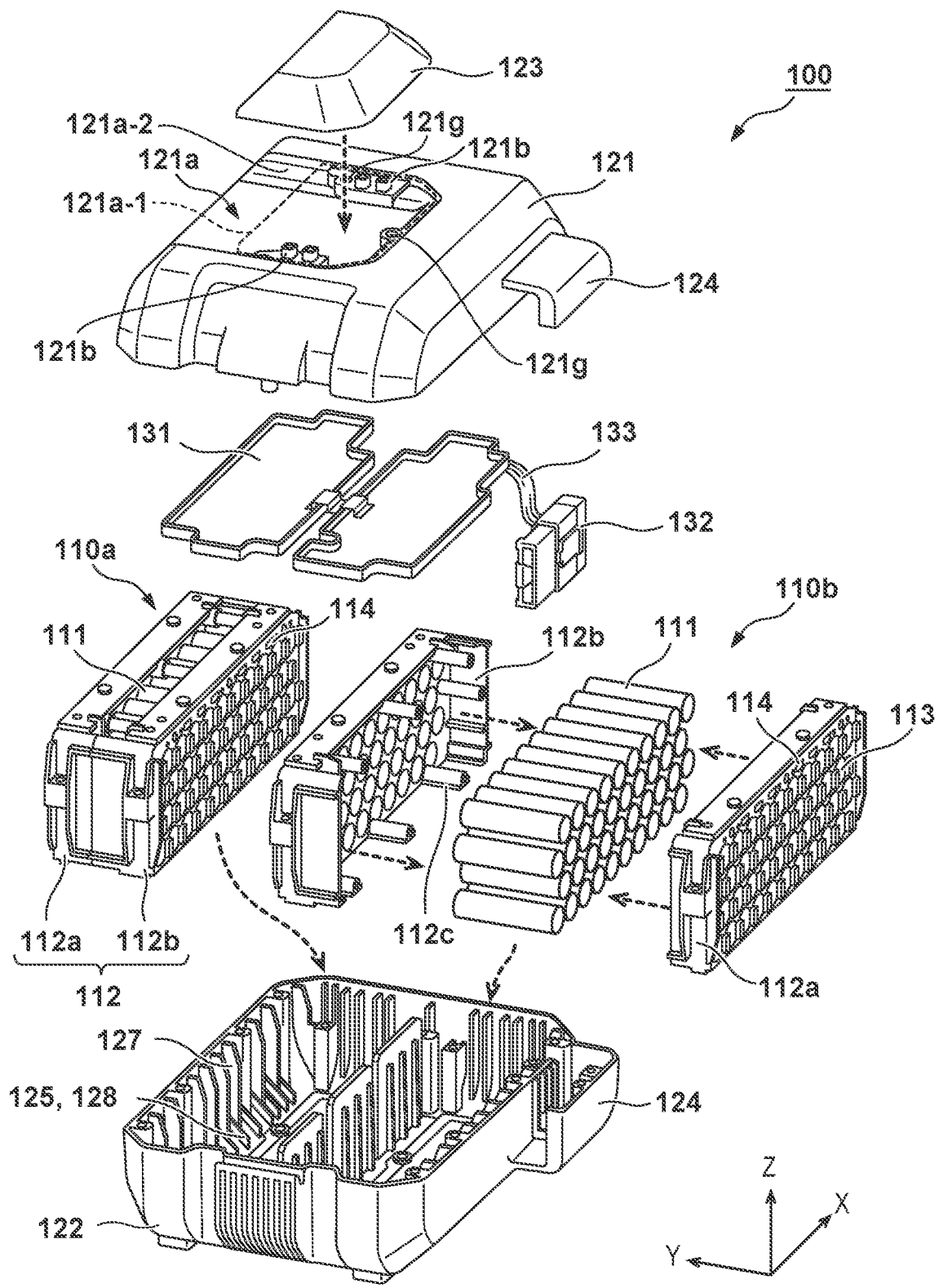
FIG. 6 is an exploded view of the battery module.

Next, the arrangement of the battery module 100 of this embodiment will be described. Each of FIGS. 2 to 5 is an external view of the battery module 100. FIG. 2 shows a top perspective view of the battery module 100, FIG. 3 shows a top view of the battery module 100, FIG. 4 shows a bottom perspective view of the battery module 100, and FIG. 5 shows a bottom view of the battery module 100. FIG. 6 is an exploded view of the battery module 100.

As shown in FIG. 6, the battery module 100 can include, for example, cell assemblies 110 (110a, 110b) each including a plurality of cylindrical battery cells 111, the accommodation case 120 for accommodating the cell assemblies 110, a circuit board 131 on which a control circuit for controlling charge/discharge of the plurality of battery cells 111 is formed, and a connector 132 as an external interface. The circuit board 131 is arranged on the cell assemblies 110, and is electrically connected to the cell assemblies 110 (the plurality of battery cells 111) and the connector 132 via a cable 133. The connector 132 is arranged in a connector housing 124 provided in the accommodation case 120.

As shown in FIG. 6, each cell assembly 110 includes the plurality of battery cells 111 arrayed with the cell axes directed in one direction, and a holding portion 112 that holds the plurality of battery cells 111. FIG. 6 shows an arrangement example of the battery module 100 in which a plurality (two) of cell assemblies 110a and 110b having the same shape are symmetrically accommodated in the accommodation case 120. FIG. 6 shows the left cell assembly 110a in a state in which the plurality of battery cells 111 are held by the holding portion 112, and the right cell assembly 110b in a state before the plurality of battery cells 111 are held by the holding portion 112.

Each of the plurality of battery cells 111 has a columnar (cylindrical) shape, and the plurality of battery cells 111 are arrayed in a plurality of rows (ten rows) in the X direction and a plurality of stages (four stages) in the Z direction (second direction) while each cell axis (column axis) is directed in the Y direction (first direction). In this embodiment, the direction in which the cell axis of each battery cell 111 is directed is the Y direction (horizontal direction), but it is not limited to the Y direction (horizontal direction) as long as the cell axes of the respective battery cells 111 are directed in the same direction. Note that in the following description, the direction in which the cell axes of the plurality of battery cells 111 are directed may be referred to as the "first direction".

The holding portion 112 includes a pair of members (a first holding member 112a and a second holding member 112b) formed with a plurality of insertion ports 113 into which the plurality of battery cells 111 are respectively inserted. The first holding member 112a is located on the outer side of the holding portion 112 in the first direction (Y direction) (on the side of a peripheral space 142 to be described later), and the second holding member 112b is located on the inner side of the holding portion 112 in the first direction (on the side of the other cell assembly 110). In the first direction (Y direction) in which the cell axis of each battery cell 111 is directed, the first holding member 112a and the second holding member 112b sandwich the plurality of battery cells 111 such that each battery cell 111 is inserted into each insertion port 113, and in this state, the first holding member 112a and the second holding member 112b are fixed to each other using fixing members such as screws. Thus, the holding portion 112 can hold the plurality of battery cells 111.

The accommodation case 120 is configured to include two surfaces (for example, an upper surface and a lower surface) that sandwich the cell assemblies 110 in a direction different from the first direction (Y direction) in which the cell axis of each battery cell 111 is directed, more specifically, in the second direction (Z direction) which is a direction perpendicular to the first direction. In this embodiment, as shown in FIGS. 2 to 6, the accommodation case 120 includes an upper member 121 including the upper surface and a lower member 122 including the lower surface. A handle member 123 is attached to an upper portion of the upper member 121 using fixing members such as screws. For example, as shown in FIG. 6, screw holes 121g for attaching the handle member 123 are provided in the upper member 121. The plurality of cell assemblies 110 are inserted inside the lower member 122 and fixed thereto using fixing members such as screws. Then, the upper member 121 and the lower member 122 are stacked on each other and fixed to each other using fixing members such as screws. For example, as shown in FIGS. 4 and 5, screw holes 122e for fixing the plurality of cell assemblies 110 are provided in the lower member 122.

The handle member 123 (grip member) that is gripped by a user when carrying the battery module 100 is attached to the upper portion of the upper member 121. In this embodiment, a partial region 121a in the upper portion of the upper member 121 is formed in a recess shape when viewed from the outside of the accommodation case 120. The handle member 123 is configured to cover a part (a partial region 121a-1) of the recess region 121a in the upper member 121, and is attached to the outer edge of the partial region 121a-1 by fixing members such as screws. Further, in order to drain water and the like having entered the inside of the accommodation case 120, the recess region 121a covered by the handle member 123 is provided with communication holes 121b that allow fluid to communicate between the outside and the inside of the accommodation case 120. The specific arrangement of the communication hole 121b will be described later in the second embodiment.

As shown in FIGS. 4 and 5, suction holes 125 for taking a gas (air) for cooling the plurality of battery cells 111 into the accommodation case 120 and exhaust holes 126 for exhausting the gas having passed between the plurality of battery cells 111 are provided, as vent holes for gas, in the lower member 122 (the lower surface of the accommodation case 120). Since such the suction holes 125 and exhaust holes 126 are provided in the lower member 122, when the battery module 100 is attached to the motor device 11, the cooling fan 11b of the motor device 11 can draw the gas in the accommodation case 120 from the exhaust holes 126 of the accommodation case 120 so that the gas can be circulated in the accommodation case 120. Here, both the suction holes 125 and the exhaust holes 126 may be provided in the upper surface (upper member 121) of the accommodation case 120, but it is preferable to provide them in the lower surface (lower member 122) of the accommodation case 120 in terms of preventing rain and the like from entering the inside of the accommodation case 120.

Figure 7:
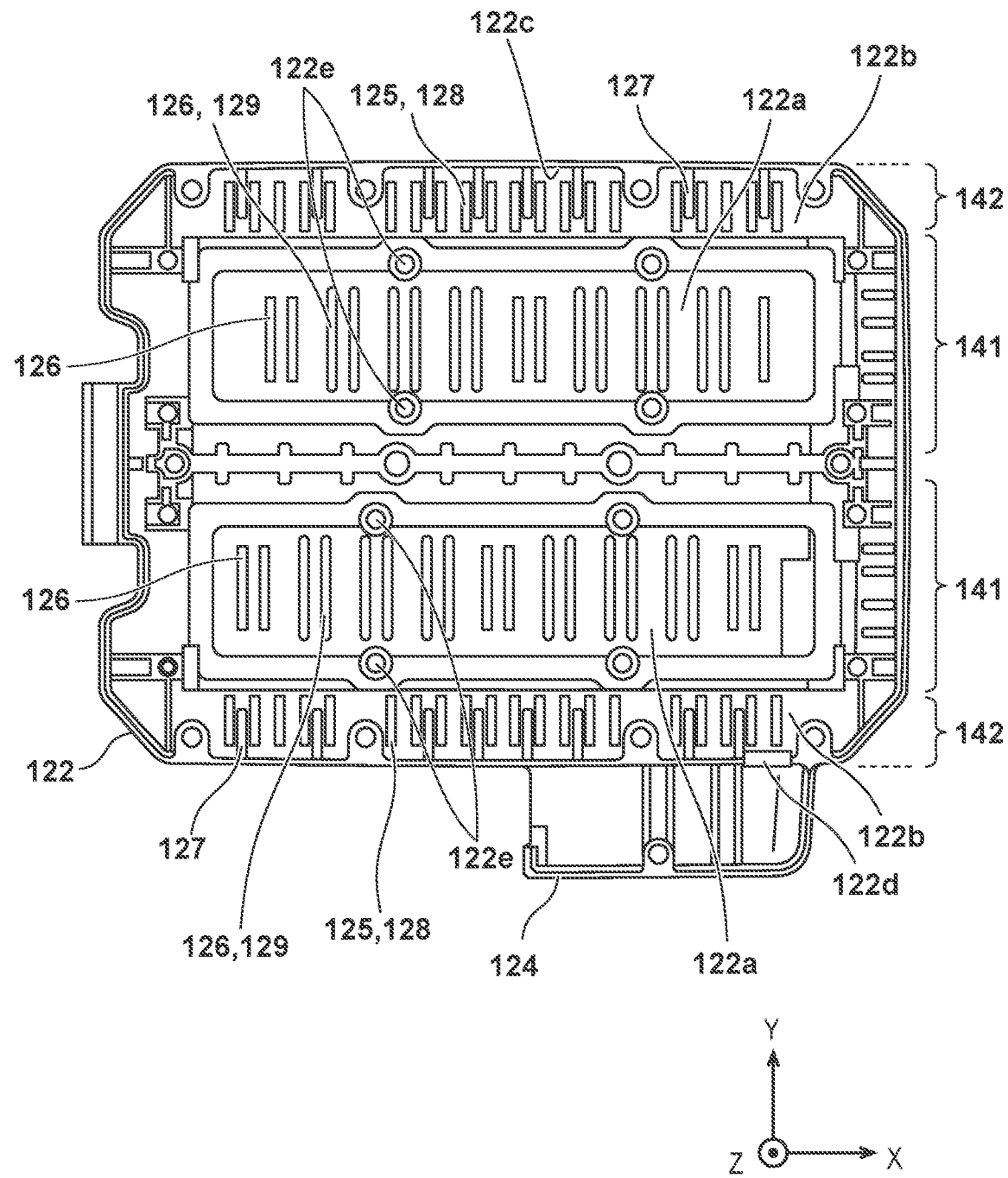
FIG. 7 is a view of a lower member of an accommodation case when viewed from above (a state in which cell assemblies are not accommodated)
Figure 8:
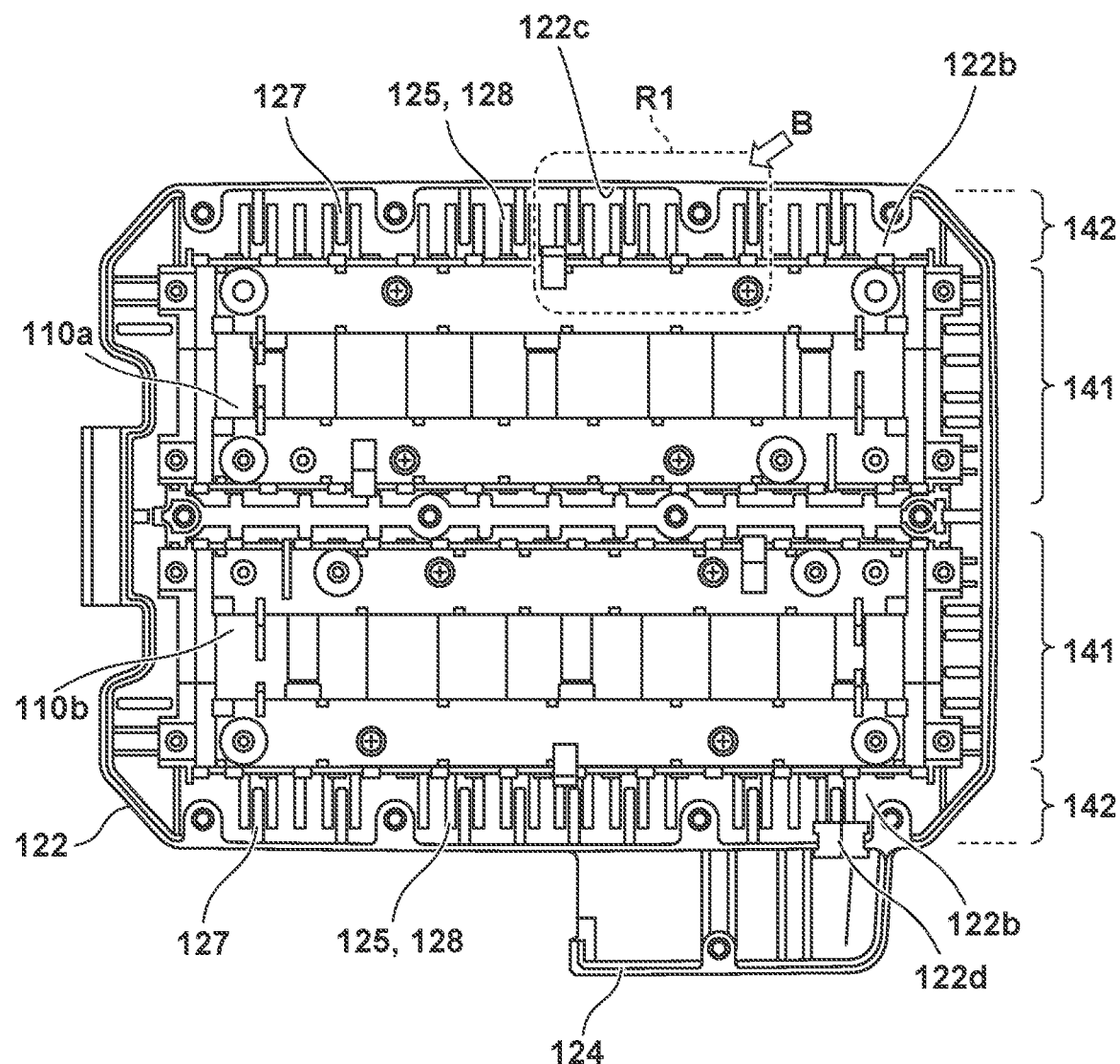
FIG. 8 is a view of the lower member of the accommodation case when viewed from above (a state in which the cell assemblies are accommodated)
Figure 9:
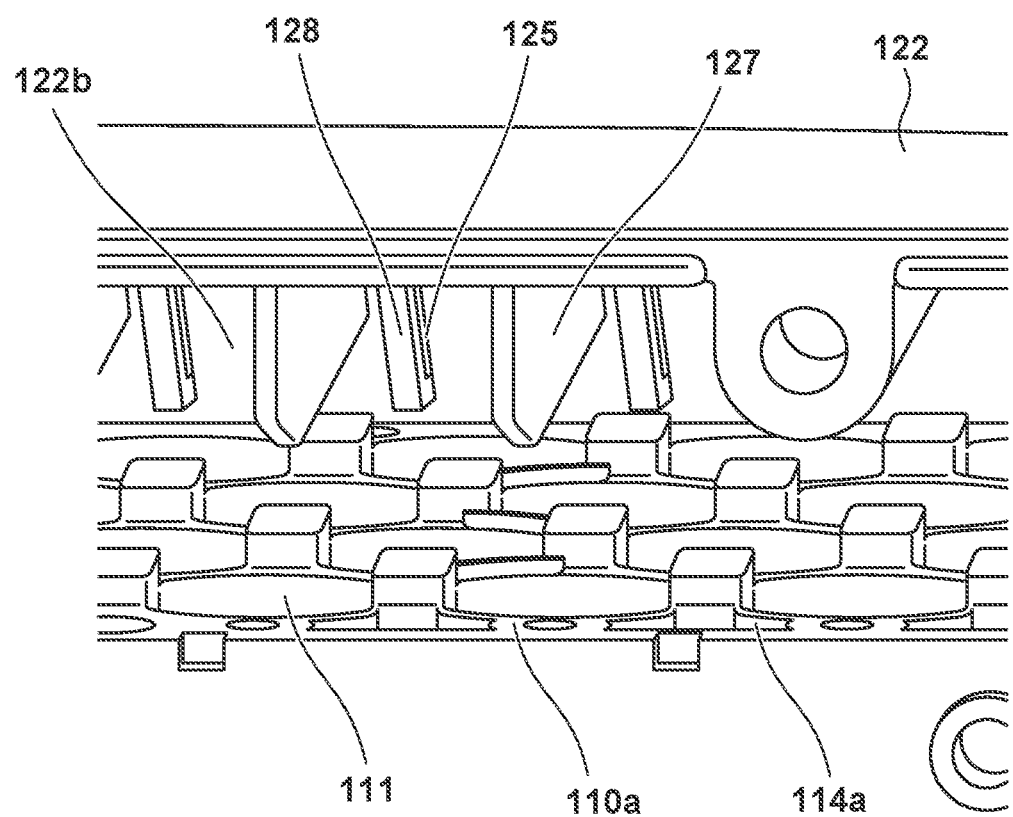
FIG. 9 is an enlarged view of a region R1 in FIG. 8.

Each of FIGS. 7 and 8 is a view of the lower member 122 of the accommodation case 120 when viewed from above (+Z direction). FIG. 7 is a view of the lower member 122 when viewed from above in a state in which the cell assemblies 110a and 110b are not accommodated. FIG. 8 is a view of the lower member 122 when viewed from above in a state in which the cell assemblies 110a and 110b are accommodated. FIG. 9 is an enlarged view of a region R1 in FIG. 8 when viewed from obliquely above as indicated by an arrow B.

The accommodation case 120 is configured to include an accommodation space 141 in which the cell assembly 110 is to be accommodated (arranged), and the peripheral space 142 located on the side of the cell assembly 110 in the first direction (Y direction). The suction holes 125 are provided in a surface included in the lower surface of the accommodation case 120 and defining the peripheral space 142, and the exhaust holes 126 are provided in a surface included in the lower surface of the accommodation case 120 and defining the accommodation space 141. More specifically, the lower surface of the accommodation case 120 (lower member 122) can include a mounting surface 122a, as the surface defining the accommodation space 141, on which the cell assembly 110 is mounted, and an inclined surface 122b, as the surface defining the peripheral space 142, which is inclined with respect to the mounting surface 122a on the side of the mounting surface 122a in the first direction. A plurality of the exhaust holes 126 arrayed along the X direction are provided in the mounting surface 122a, and a plurality of the suction holes 125 arrayed along the X direction are provided in the inclined surface 122b.

Further, as shown in FIGS. 6 to 9, the accommodation case 120 includes, in the peripheral space 142, a plurality of ribs 127 each extending in the second direction (Z direction) which is the array direction (stacking direction) of the plurality of battery cells 111. The plurality of ribs 127 can be provided to reinforce the accommodation case 120, but in this embodiment, they are arranged as baffle plates for guiding the gas taken into the peripheral space 142 from the suction holes 125 to the second direction (Z direction). For example, each of the plurality of ribs 127 is connected to a side surface 122c, that connects the upper surface and the lower surface of the accommodation case 120, and the lower surface (inclined surface 122b) of the accommodation case 120, and has a plate shape parallel to the first direction (Y direction) and the second direction (Z direction). Further, the plurality of ribs 127 are provided so as to be spaced apart from each other along the X direction such that at least one suction hole 125 is arranged therebetween.

By arranging the plurality of ribs 127 as baffle plates as described above, the gas taken into the peripheral space 142 from the plurality of suction holes 125 can be efficiently guided to the second direction, so that the plurality of battery cells 111 in the cell assembly 110 can be efficiently cooled. In addition, since the number of parts of the battery module 100 is reduced by making the plurality of ribs 127 function as the baffle plates, the device arrangement can be simplified and the device cost can be decreased.

Figure 10:
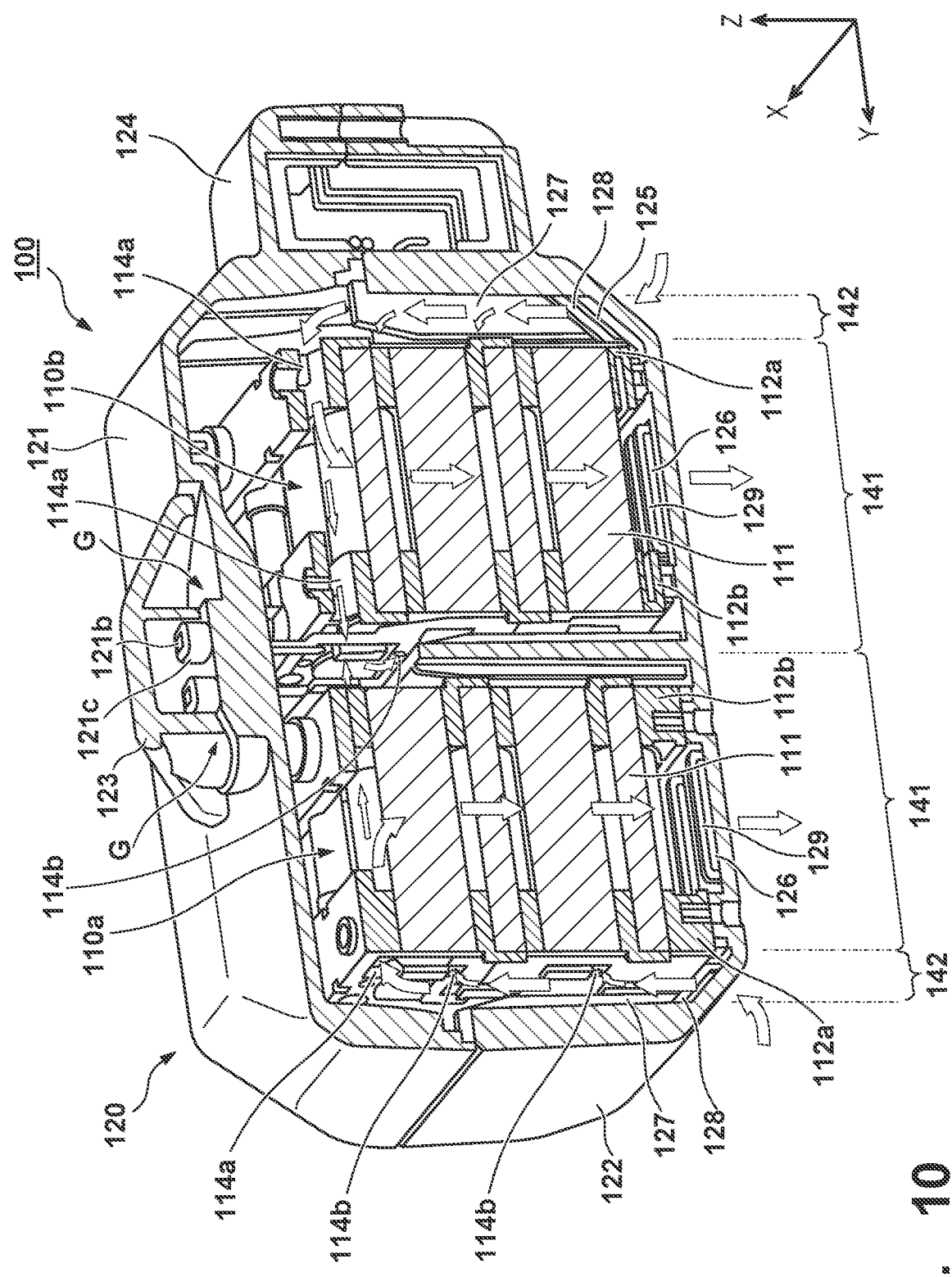
FIG. 10 is a view showing the flow of a gas in the accommodation case.
Figure 11:
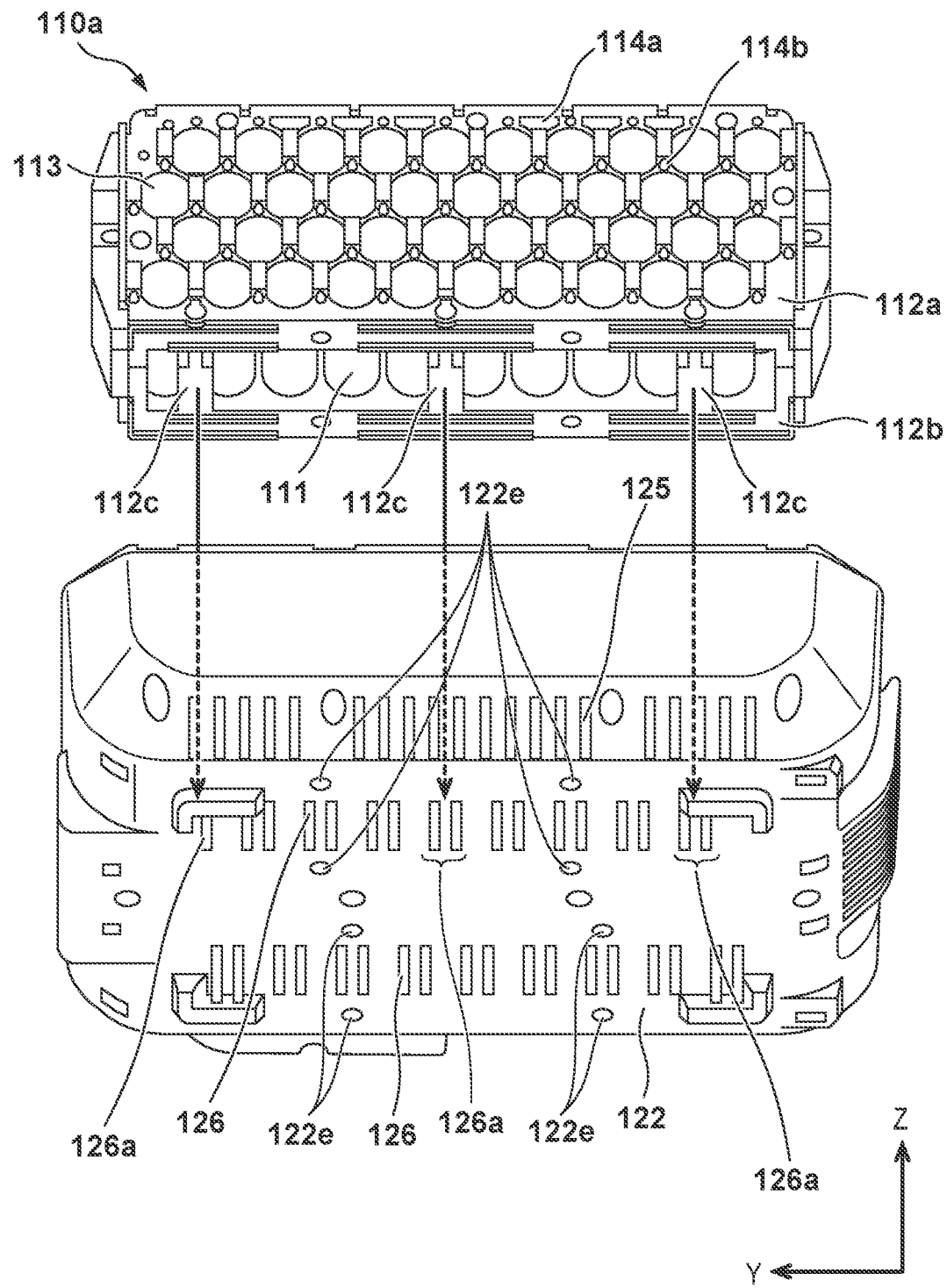
FIG. 11 is a view showing the cell assembly and the lower member of the accommodation case.

Next, the flow of the gas in the accommodation case 120 will be described. FIG. 10 is a perspective view of the Y-Z section (the section taken along A-A in FIGS. 3 and 5) of the battery module 100. In FIG. 10, the flow of the gas is indicated by arrows, and the size of the arrow represents the flow rate of the gas. Note that in the actual battery module 100, the circuit board 131 is arranged on the cell assemblies 110a and 110b as described above, but the circuit board 131 is not shown in FIG. 10 for clarity. FIG. 11 is a view showing a state in which the cell assembly 110 (110a) is separated from the lower member 122 of the accommodation case 120 when viewed from obliquely below on the peripheral space 142 side.

The gas taken into the peripheral space 142 from the plurality of suction holes 125 is guided to the second direction (+Z direction) toward the upper surface by the plurality of ribs 127 serving as the baffle plates. The gas guided by the plurality of ribs 127 in the peripheral space 142 is guided to gaps between the plurality of battery cells 111 (into the accommodation space 141) via a plurality of openings 114 formed in the first holding member 112a of the cell assembly 110, and exhausted from the plurality of exhaust holes 126. In this manner, in the battery module 100 of this embodiment, the suction holes 125 and the exhaust holes 126 are provided in the lower surface of the accommodation case 120 and airflows in opposite directions are generated in the accommodation space 141 and the peripheral space 142. Thus, the plurality of battery cells 111 arrayed in the accommodation space 141 can be efficiently cooled.

In this embodiment, as shown in FIGS. 6 and 11, the plurality of openings 114 formed in the first holding member 112a include a plurality of first openings 114a and a plurality of second openings 114b. The plurality of first openings 114a can be provided on the downstream side of the gas in the peripheral space 142, specifically, above the plurality of battery cells 111 (the plurality of insertion holes 113), more specifically, above the top battery cells 111. Further, the plurality of second openings 114b can be provided on the upstream side of the gas in the peripheral space 142, specifically, between the plurality of battery cells 111. Note that each of the plurality of second openings 114b is formed smaller than each of the plurality of first openings 114a. By providing the plurality of first openings 114a and the plurality of second openings 114b in the first holding member 112a as described above, the plurality of battery cells 111 can be efficiently cooled. Here, in each of the cell assemblies 110a and 110b, the plurality of openings 114 (the first openings 114a and the second openings 114b) may be formed in the second holding member 112b arranged on the inner side in the battery module 100, as in the first holding member 112a. In this case, as shown in FIG. 10, it is also possible to guide the gas to a gap between the plurality of cell assemblies 110a and 110b (between a plurality of the accommodation spaces 141) via the first openings 114a of the second holding member 112b, and further guide the gas from the second openings 114b of the second holding member 112b to gaps between the plurality of battery cells 111. This can further improve the cooling efficiency of the battery cells 111 of the plurality of cell assemblies 110a and 110b.

The battery module 100 configured as described above may be placed on a floor, a shelf, or the like in a state in which it is detached from the working machine 1 (motor device 11), that is, stand alone. In this case, if a foreign substance (for example, a wire or a screw) on the floor or shelf enters from the vent hole (suction hole 125 or exhaust hole 126) of the accommodation case 120, the battery cell 111 in the accommodation case 120 can be damaged. Therefore, the battery module 100 of this embodiment takes measures to reduce entry of foreign substances from the suction holes 125 and the exhaust holes 126 formed in the accommodation case 120.

As a specific arrangement, guard members 128 for reducing entry of foreign substances from the suction holes 125 are provided in the accommodation case 120. As shown in FIG. 9, each guard member 128 extends in the longitudinal direction of the suction hole 125 and is provided inside the accommodation case 120 with respect to the suction hole 125. That is, the guard member 128 is a member that covers the suction hole 125 so as not to block the suction hole 125 in the inside of the accommodation case 120. By providing the guard member 128 to the suction hole 125 in this manner, the flow path that passes through the suction hole 125 can be formed in a labyrinth structure, so that it is possible to reduce entry of foreign substances such as wires into the accommodation case 120 from the suction hole 125.

Similar to the suction hole 125, a guard member 129 for the exhaust hole 126 is provided in the accommodation case 120 so that a labyrinth structure can be formed. However, some exhaust holes 126a are not provided with the guide members 129, and a connecting portion 112c between the first holding member 112a and the second holding member 112b in the cell assembly 110 has the role (function) of the guard member 129. With this arrangement, the battery module 100 (accommodation case 120) can be simplified and miniaturized. That is, as shown in FIGS. 11 and 12, the plurality of exhaust holes 126 include the exhaust holes 126a each of which is covered by the connecting portion 112c between the first holding member 112a and the second holding member 112b so as not to block the exhaust holes 126a in the inside of the accommodation case 120 so that the flow path is formed in the labyrinth structure.

Here, the connecting portion 112c is a member provided in at least one of the first holding member 112a and the second holding member 112b and used to connect them. The connecting portion 112c can be configured to include, for example, a screw hole or the like so that a fixing member (such as a screw) for fixing the first holding member 112a and the second holding member 112b to each other can be inserted. Further, the connecting portions 112c can be provided at several positions in the upper portion and the lower portion of the holding portion 112 so that, for example, the gas having passed between the plurality of battery cells 111 can be efficiently exhausted from the exhaust holes 126 of the accommodation case 120. In this embodiment, the connecting portions 112c are provided at three positions in each of the upper end and the lower end of the holding portion 112.

Figure 12:
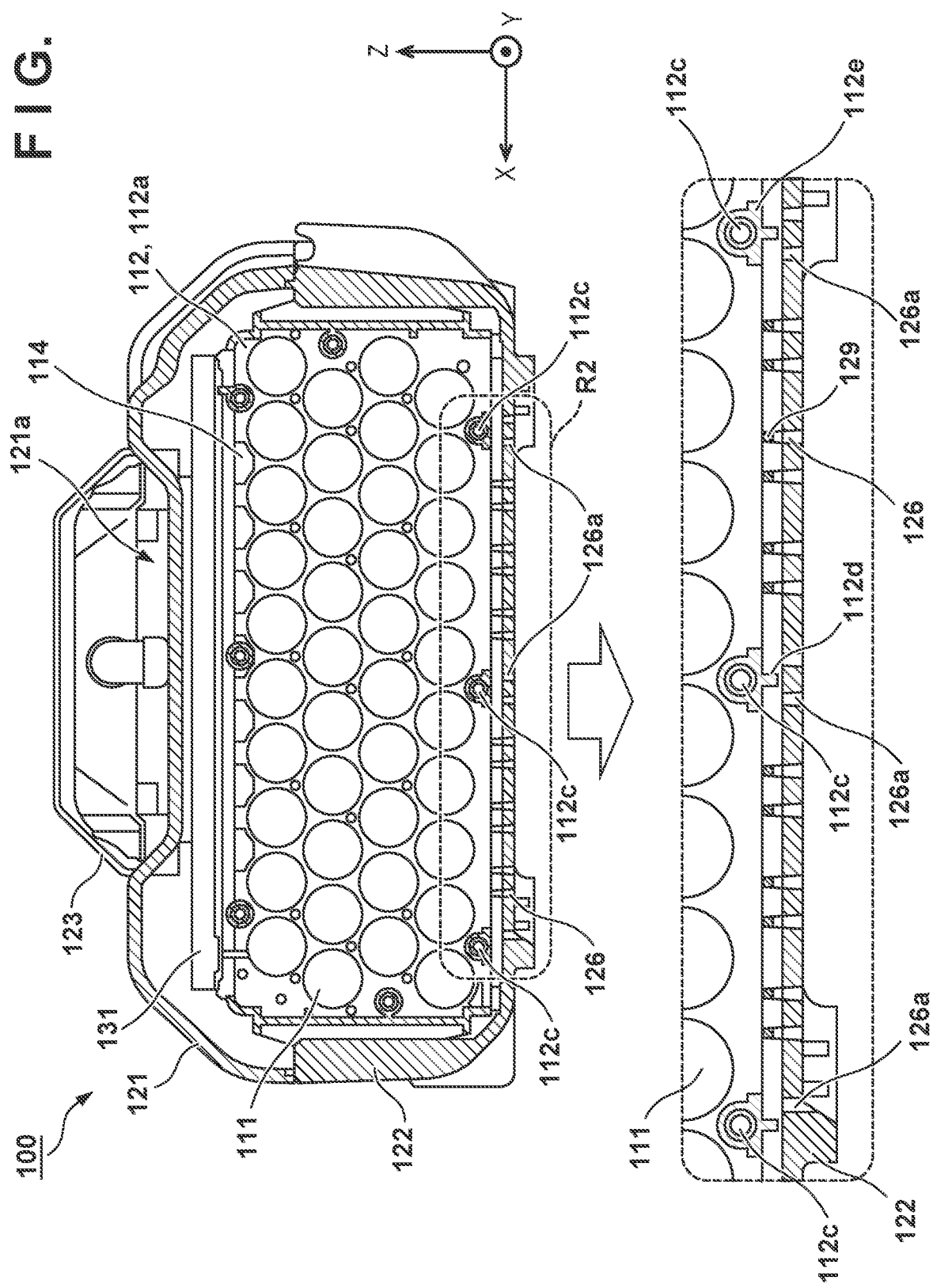
FIG. 12 is a sectional view of the battery module in an intermediate position between a first holding member and a second holding member.

FIG. 12 is a Z-X sectional view (a sectional view taken along a line C-C in FIGS. 3 and 5) of the battery module 100, that is, a Z-X sectional view of the cell assembly 110a at an intermediate position between the first holding member 112a and the second holding member 112b. FIG. 12 also shows an enlarged view of the lower portion (a region R2) of the battery module 100.

As shown in FIG. 12, the exhaust hole 126 above which no connecting portion 112c of the holding portion 112 is arranged is provided with the guard member 129 inside the accommodation case 120, so that the flow path passing through the exhaust hole 126 is formed in the labyrinth structure. On the other hand, the exhaust hole 126a above which the connecting portion 112c is arranged is provided with no guard member 129 but covered by the connecting portion 112c, so that the flow path passing through the exhaust hole 126a is formed in the labyrinth structure. With this arrangement, it can be avoided that the guard member 129 and the connecting portion 112c are overlapped with each other above the exhaust hole 126a, so that the battery module 100 (accommodation case 120) can be simplified and miniaturized. Consequently, this leads to a decrease in device cost such as a reduction in material cost.

In this embodiment, the connecting portion 112c is preferably configured to have a planar shape 112e in which the surface on the exhaust hole 126a side has a larger area than the exhaust hole 126a. This can improve the function of preventing a foreign substance from entering through the exhaust hole 126a by the connecting portion 112c. In addition, the connecting portion 112c is preferably configured to cover a plurality of the exhaust holes 126a, that is, to be arranged above the plurality of the exhaust holes 126a. In the example shown in FIG. 12, one connecting portion 112c is configured to cover two exhaust holes 126a adjacent to each other. This can further simplify the battery module 100. Further, as shown in the enlarged view in FIG. 12, the connecting portion 112c is preferably configured to include, at a position facing a portion between the plurality of the exhaust holes 126a in the accommodation case 120, a convex portion 112d protruding toward the portion. With this arrangement, it is possible to bring the connecting portion 112c closer to the exhaust hole 126a, and restrict the entry path of foreign substances from the exhaust hole 126a. For example, in the example shown in the enlarged view in FIG. 12, the entry path of foreign substances from the exhaust hole 126a is restricted to one of the +X direction and the −X direction, so that the effect of reducing entry of foreign substances can be improved.

As has been described above, in the battery module 100 of this embodiment, the flow path passing through the vent hole (exhaust hole 126a) of the accommodation case 120 is formed in the labyrinth structure by covering the vent hole by the connecting portion 112c of the holding portion 112. With this arrangement, the battery module 100 (accommodation case 120) can be simplified, and a decrease in device cost such as a reduction in material cost can be implemented.

Second Embodiment

The battery module 100 described above may be placed on a floor, a shelf, or the like by a user in an arbitrary posture or orientation in a state in which it is detached from the working machine 1 (motor device 11) (that is, stand alone). For example, the battery module 100 may be placed such that the lower surface formed with the vent holes (suction holes 125 and exhaust holes 126) faces upward. In this case, if water enters from the vent hole, it is accumulated inside the accommodation case 120. Therefore, in a battery module 100 of this embodiment, communication holes 121b for draining water having entered the inside of an accommodation case 120 are formed in an upper member 121 (a surface opposite to the surface formed with the vent holes) of the accommodation case 120. Note that this embodiment basically takes over the arrangement of the battery module 100 of the first embodiment, unless otherwise specified.

The communication hole 121b is a hole that allows fluid to communicate between the inside and the outside of the accommodation case 120 and, as shown in FIG. 6, is provided in a recess partial region 121a-1 covered by a handle member 123 in the upper member 121 of the accommodation case 120. More specifically, the communication hole 121b is provided in a side surface (inclined surface) of the recess partial region 121a-1. By providing the communication hole 121b as described above, even when the battery module 100 is placed upside down (that is, such that the lower surface formed with the vent holes faces upward), water having entered the accommodation case 120 can be drained through the communication hole 121b. In addition, since the communication hole 121b is provided in the side surface (inclined surface 121a-2) of the recess partial region 121a-1, when the battery module 100 is placed upside down (that is, such that the lower surface formed with the vent holes faces upward), the communication hole 121b is located lower as compared with a case in which the communication hole 121b is provided in the bottom surface of the recess partial region 121a-1. Accordingly, it is possible to further suppress accumulation of water in the accommodation case 120. Since the communication hole 121b is covered by the handle member 123, it is possible to prevent rain and the like from entering the inside of the accommodation case 120 through the communication hole 121b in a normal posture. Note that the normal posture is the posture of the battery module 100 in which the lower surface provided with the vent holes is directed downward, such as a case in which it is attached to a motor device 11 or the like.

Further, in order to further prevent rain and the like from entering the inside of the accommodation case 120 from the communication hole 121b in the normal posture, the flow path passing through the communication hole 121b may be formed in a labyrinth structure. For example, as shown in FIG. 10, a protruding portion 121c protruding upward (+Z direction) is provided in a recess region 121a (more specifically, the partial region 121a-1) in the upper member 121, and the communication hole 121b is formed in the center of the protruding portion 121c. Then, the handle member 123 is configured so as to cover the protruding portion 121c and such that a gap G between the handle member 123 and the upper member 121 is formed lower than the distal end of the protruding portion 121c. That is, the flow path direction different from the flow path direction of the communication hole 121b is formed by the gap G, so that the flow path communicating from the communication hole 121b to the outside can be formed in the labyrinth structure.

As has been described above, the accommodation case 120 of this embodiment includes the communication holes 121b in the recess partial region 121a-1 covered by the handle member 123. Thus, even if the battery module 100 is placed upside down and water enters the accommodation case 120, the water can be drained through the communication holes 121b.

Third Embodiment

Figure 13:
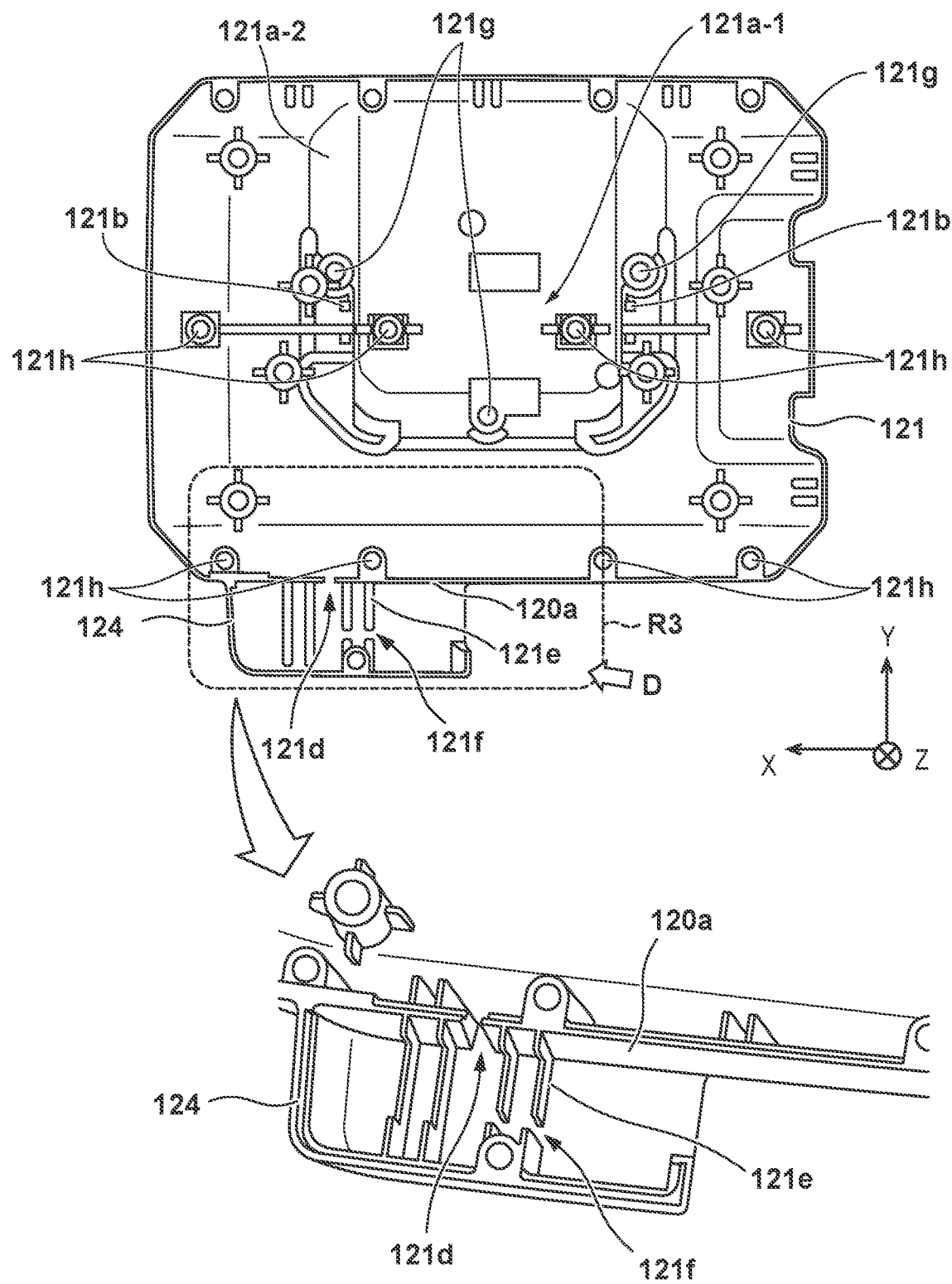
FIG. 13 is a view of an upper member of the accommodation case when viewed from inside.

In the third embodiment, an example will be described in which a communication hole 121d (second communication hole) for draining water from the inside of the accommodation case 120 is provided in a connector housing 124. FIG. 13 is a view of an upper member 121 of the accommodation case 120 when viewed from the inside (−Z direction side). FIG. 13 also shows an enlarged perspective view of the connector housing 124 (a region R3) in the upper member 121. As shown in FIG. 13, the upper member 121 is provided with screw holes 121h for fixing it to a lower member 122 by fixing members (such as screws). Note that this embodiment basically takes over the arrangement of the battery module 100 of each of the first and second embodiments, unless otherwise specified.

The accommodation case 120 is configured to define (divide) a cell accommodation space (an accommodation space 141 and a peripheral space 142) in which a cell assembly 110 is to be accommodated and a terminal accommodation space (the internal space of the connector housing 124) in which a connector 132 (terminal) as an external interface that performs charge and discharge of the plurality of battery cells 111 is to be accommodated. The communication hole 121d for draining water from the inside of the accommodation case is formed in a partition wall 120a for partitioning the cell accommodation space and the terminal accommodation space, that is, a side wall between the cell accommodation space and the terminal accommodation space. In this embodiment, an opening 122d for allowing a cable 133 connected to the connector 132 to pass therethrough is formed in the lower member 122 of the accommodation case 120 as shown in FIGS. 7 and 8, and the communication hole 121d is formed in the upper member 121 of the accommodation case 120 as shown in FIG. 13. That is, the opening 122d for allowing the cable 133 to pass therethrough and the communication hole 121d are formed at positions spaced apart from each other in the partition wall 120a. With this arrangement, even when the battery module 100 is placed upside down (in a state in which the upper member 121 of the accommodation case 120 faces downward), water having entered the accommodation case 120 (for example, water that is easily accumulated outside a recess partial region 121a-1) can be efficiently drained from the accommodation case 120 via the communication hole 121d. In addition, by providing the communication hole 121d in the partition wall 120a so as to be narrower than the opening 122d, it is possible to achieve both rigidity and drainage of the accommodation case 120.

Further, as shown in FIG. 13, the upper member 121 in the connector housing 124 is provided with ribs 121e for fixing the position of the connector 132 in the connector housing 124. Each rib 121e is formed with a notch 121f for allowing water coming out of the cell accommodation space via the communication hole 121d to pass therethrough. With this arrangement, even when the battery module 100 is placed with the connector housing 124 facing downward, water having entered the accommodation case 120 can be drained from the accommodation case 120 via the flow path including the communication hole 121d and the notches 121f.

Summary of Embodiments

1. The battery module according to the above-described embodiment comprises
   a cell assembly (for example, 110) formed by sandwiching a plurality of battery cells (for example, 111) by a pair of holding members (for example, 112a, 112b), and
   an accommodation case (for example, 120) configured to accommodate the cell assembly,
   wherein the accommodation case includes a vent hole (for example, 126a) for gas, and
   a flow path passing through the vent hole is formed in a labyrinth structure by covering the vent hole by a connecting portion (for example, 112c) between the pair of holding members.

According to this arrangement, it is possible to reduce entry of foreign substances (wires) from the vent hole of the battery module with a simple structure.

2. In the battery module according to the above-described embodiment,
   a surface of the connecting portion on a side of the vent hole has a planar shape having a larger area than the vent hole.

According to this arrangement, the connecting portion between the two holding members can cover the entire vent hole, so that it is possible to further reduce entry of foreign substances from the vent hole.

3. In the battery module according to the above-described embodiment,
   the connecting portion is configured to cover a plurality of the vent holes, and includes, at a position facing a portion between the plurality of the vent holes in the accommodation case, a convex portion (for example, 112d) protruding toward the portion.

According to this arrangement, the entry path of foreign substances from the vent hole is restricted, so that the effect of reducing entry of foreign substances can be improved.

4. The battery module according to the above-described embodiment comprises
   a cell assembly (for example, 110) formed by sandwiching a plurality of battery cells (for example, 111) by a pair of holding members (for example, 112a, 112b),
   an accommodation case (for example, 120) configured to accommodate the cell assembly, and
   a grip member (for example, 123) provided so as to cover a partial region (for example, 121a-1) of the accommodation case from the outside,
   wherein the accommodation case includes a communication hole (for example, 121b) for fluid in the partial region covered by the grip member.

According to this arrangement, even if the battery module is placed upside down and water enters the accommodation case, the water can be drained through the communication hole. In addition, since the communication hole is covered by the grip member, it is possible to reduce entry of rain and the like from the communication hole during normal use.

5. In the battery module according to the above-described embodiment,
   the partial region covered by the grip member is formed in a recess shape when viewed from the outside of the accommodation case, and
   the communication hole is provided in a side surface of the partial region formed in the recess shape.

According to this arrangement, when the battery module is placed upside down, it is possible to efficiently drain water that is easily accumulated outside the recess partial region in the accommodation case.

6. In the battery module according to the above-described embodiment,
   the side surface of the partial region in which the communication hole is provided is an inclined surface inclined with respect to a bottom surface of the partial region.

According to this arrangement, when the battery module is placed upside down, the communication hole is located lower as compared with a case in which the communication hole is provided in the bottom surface of the recess partial region. Accordingly, it is possible to further suppress accumulation of water in the accommodation case.

7. In the battery module according to the above-described embodiment,
   a flow path passing through the communication hole is formed in a labyrinth structure by the grip member.

According to this arrangement, it is possible to further reduce entry of rain and the like from the communication hole.

8. In the battery module according to the above-described embodiment,
   the accommodation case is configured to include a cell accommodation space in which the cell assembly is accommodated and a terminal accommodation space in which a terminal (for example, 132) configured to perform charge and discharge of the plurality of battery cells is accommodated, and
   in the accommodation case, a second communication hole (for example, 121d) that communicates between the cell accommodation space and the terminal accommodation space is provided in a partition wall (for example, 120a) configured to partition the cell accommodation space and the terminal accommodation space.

According to this arrangement, water having entered the accommodation case can be drained through the second communication hole. In addition, since the second communication hole is provided in the partition wall between the cell accommodation space and the terminal accommodation space, it is possible to reduce entry of rain and the like from the second communication hole during normal use.

9. In the battery module according to the above-described embodiment,
   the terminal is electrically connected to the plurality of battery cells via a cable (for example, 133), and
   the second communication hole is provided, in the partition wall, at a position spaced apart from an opening (for example, 122d) through which the cable passes.

According to this arrangement, water having entered the accommodation case can be efficiently drained through the second communication hole.

10. In the battery module according to the above-described embodiment,
   the accommodation case is formed by a pair of members (for example, 121, 122) separable in a direction different from an array direction of the cell accommodation space and the terminal accommodation space,
   the second communication hole is formed in one of the pair of members, and
   the opening through which the cable passes is formed in the other one of the pair of members.

According to this arrangement, the opening through which the cable passes and the second communication hole are formed in different members, so that it is possible to reduce the influence, on the terminal and the cable, of water drained from the cell accommodation space to the terminal accommodation space via the second communication hole, and the accommodation case can be manufactured more easily.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A battery module comprising:
   a cell assembly formed by sandwiching a plurality of battery cells by a pair of holding members; and
   an accommodation case configured to accommodate the cell assembly,
   wherein the accommodation case includes a plurality of vent holes through which gas passes,
   wherein a plurality of first vent holes among the plurality of vent holes are covered by a connecting portion between the pair of holding members, the connecting portion having a planar-shaped surface on a side of the first vent holes inside the accommodation case, and
   wherein a flow path passing through each of a plurality of second vent holes different from the first vent holes among the plurality of vent holes is formed in a labyrinth structure, by a guard member configured to extend along a longitudinal direction of each second vent hole inside the accommodation case and cover each second vent hole so as not to block each second vent hole.

2. The battery module according to claim 1, wherein the planar-shaped surface of the connecting portion having a larger area than each first vent hole.

3. The battery module according to claim 1, wherein the connecting portion is configured to cover at least two first vent holes among the plurality of vent holes, and includes, at a position facing a portion between the at least two first vent holes in the accommodation case, a convex portion protruding toward the portion.

4. The battery module according to claim 1, wherein
the accommodation case is configured to include a cell accommodation space in which the cell assembly is accommodated and a terminal accommodation space in which a terminal configured to perform charge and discharge of the plurality of battery cells is accommodated, and
in the accommodation case, a communication hole that communicates between the cell accommodation space and the terminal accommodation space is provided in a partition wall configured to partition the cell accommodation space and the terminal accommodation space.

5. The battery module according to claim 4, wherein
the terminal is electrically connected to the plurality of battery cells via a cable, and
the communication hole is provided, in the partition wall, at a position spaced apart from an opening through which the cable passes.

6. The battery module according to claim 5, wherein
the accommodation case is formed by a pair of members separable in a direction different from an array direction of the cell accommodation space and the terminal accommodation space,
the communication hole is formed in one of the pair of members, and
the opening through which the cable passes is formed in the other one of the pair of members.

7. The battery module according to claim 1, further comprising a grip member provided so as to cover a partial region of the accommodation case from the outside,
wherein the accommodation case includes a communication hole for fluid in the partial region covered by the grip member.

8. The battery module according to claim 7, wherein
the partial region covered by the grip member is formed in a recess shape when viewed from the outside of the accommodation case, and
the communication hole is provided in a side surface of the partial region formed in the recess shape.

9. The battery module according to claim 8, wherein the side surface of the partial region in which the communication hole is provided is an inclined surface inclined with respect to a bottom surface of the partial region.

10. The battery module according to claim 7, wherein a flow path passing through the communication hole is formed in a labyrinth structure by the grip member.

11. An electric power unit comprising:
a battery module defined in claim 1; and
a motor configured to be operated by power from the battery module.

12. A working machine comprising:
an electric power unit defined in claim 11; and
a working unit configured to perform work by power from the electric power unit.

* * * * *